United States Patent Office 3,446,567
Patented May 27, 1969

3,446,567
HUMAN OR ANIMAL HAIR COLOURANTS COMPRISING NITROBENZENE DYES
Horst Augustin, Mannheim, Neu-Ostheim, and Ralph Heringlake, Hamburg, Germany, assignors to Lever Brothers Company, New York, N.Y., a corporation of Maine.
No Drawing. Filed Apr. 13, 1965, Ser. No. 447,866
Claims priority, application Germany, Apr. 14, 1964, U 10,657
Int. Cl. D06p 3/04; A61k 7/12
U.S. Cl. 8—10    4 Claims

---

ABSTRACT OF THE DISCLOSURE

This disclosure is concerned with certain bis(beta-hydroxyalkyl)-amino-2-amino-4-nitro-benzene compounds which are yellow-orange dyestuffs. This disclosure is also concerned with hair colourants containing these yellow-orange dyestuffs and certain blue-violet dyestuffs for dyeing previously treated hair to an even shade, i.e., a uniform color.

---

This invention relates to colourants for dyeing or tinting human or animal hair.

According to the invention there is provided a new yellow-orange dyestuff for colouring hair having the formula:

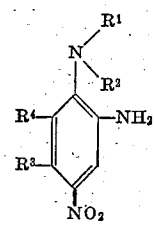

where
$R^1$ and $R^2$ represent hydroxyalkyl groups having 2 to 6 carbon atoms; and
$R^3$ and $R^4$ represent hydrogen or alkyl groups having 1 to 4 carbon atoms.
$R^1$ and $R^2$ may be the same or different and $R^3$ and $R^4$ may be the same or different.

Examples of the groups $R^1$ and $R^2$ are —CH$_2$CH$_2$OH, —CH$_2$CH(OH)CH$_3$ and —CH$_2$CH(OH)CH$_2$OH.

The groups $R^3$ and $R^4$ may be methyl, ethyl, propyl or butyl groups.

The dyes of the invention have good fastness to light.

The yellow-orange dyes of the invention can be obtained by converting 1-chloro-2,4-dinitrobenzene or its 5- and/or 6-alkyl-substituted derivatives with hydroxyalkyl amines having the formula HNR$^1$R$^2$, where $R^1$ and $R^2$ have the above meanings, and partially reducing the corresponding reaction products with, for example, hydrogen sulphide or sodium polysulphide.

It has been found that when blue-violet dyestuffs of the formula

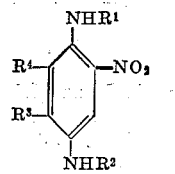

are used in combination with the above yellow-orange dyestuffs good results are obtained.

Accordingly the present invention also provides a hair colourant comprising a blue-violet component having the formula

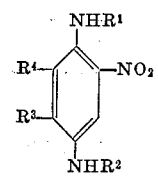

and a yellow-orange component having the formula

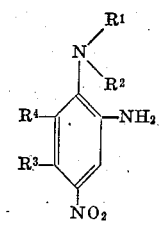

where $R^1$, $R^2$, $R^3$ and $R^4$ have the above meanings. These hair colourants dye hair a uniform colour even when a part of the hair has been previously treated such as by permanent waving or previous dyeing.

For example, if strands of white hair, half permanently waved, are dyed with solutions containing equal parts of the blue-violet and yellow-orange dyes of the above formulae, natural blonde and brown shades are obtained depending on the concentration of the dyes, the difference between the permanently waved and the untreated parts being apparent only in the somewhat different intensity of the dye, but not in any substantial difference in the shade. Further, the above combination of dyes gives shades having good fastness to light.

The above blue-violet dyes can be prepared by converting 1,4-diamino-2-nitrobenzene or its 5- and/or 6-alkyl-substituted derivatives with hydroxyalkyl halides to the 1,4-di-substituted compounds.

The hair colourants of the invention may also contain other direct dyes, as well as other components usually used in hair colourants.

The hair colourants of the invention may be in the form of a tinting agent such as, for example, a hair rinse or colour shampoo.

The following examples illustrate the invention. Percentages are by weight.

Example 1

This example concerns the preparation of bis-(beta-hydroxyethyl)-amino-2-amino-4-nitro-benzene.

2,4-dinitro-chloro-benzene was condensed with an excess of diethanolamine to produce di-(beta-hydroxyethyl)-amino-2,4-dinitro-benzene. On recrystallisation from alcohol a yellow compound having a melting point of 90° C. was obtained.

This compound was then partially reduced by introducing hydrogen sulphide into a stirred amoniacal-alcoholic solution of the compound as the temperature of the solution was raised to the boiling point.

After evaporation of the solution, the residue was suspended in 2 N HCl, sulphur filtered off, and the dyestuff was precipitated by the addition of sodium hydroxide solution. Upon recrystallisation from water bis-(beta-hydroxyethyl)-amino-2-amino-4-nitro-benzene was obtained as a yellow-orange solid having a melting point of 105° C. ($\lambda_{max}$=398 m$\mu$; $\epsilon$=4610).

This compound gave, on dyeing hair, a yellow-orange shade having good fastness to light.

The compound was found to have a light fastness superior to that of the yellow dyestuff 1-(beta-hydroxyethyl)-amino-2-amino-4-nitro-benzene.

Example 2

N-(beta-hydroxyethyl) - N - (beta - hydroxypropyl)-amino-2-amino-4-nitro-benzene was prepared in a manner similar to that described in Example 1, ethanol-isopropanol-amine $$\left( HN \begin{matrix} CH_2CH_2OH \\ CH_2CH(OH)CH_3 \end{matrix} \right)$$

being used instead of diethanolamine. Further, the partial reduction was carried out with sodium polysulphide instead of hydrogen sulphide.

The compound obtained had a melting point of 126° C. ($\lambda_{max}$=395 m$\mu$; $\epsilon$=4990).

Example 3

Bis-(beta-hydroxypropyl)-amino - 2 - amino - 4 - nitro-benzene was prepared in a manner analogous to that referred to in Example 2, using di-isopropanolamine instead of ethanol-isopropanol-amine.

The compound obtained had a melting point of 114–115° C. ($\lambda_{max}$=400 m$\mu$; $\epsilon$=4770).

Example 4

0.5 g. of 1,4-di-(beta-hydroxyethylamino)-2-nitro-benzene and 0.5 g. of bis-(beta-hydroxyethyl)-amino-2-amino-4-nitro-benzene were dissolved in a mixture of 96 g. of water, 2 g. of triethanolamine and 1 g. of a wetting agent. This solution dyed strands of white hair, half permanently waved, an even natural brown shade in 20 minutes at 30° C.

In order to demonstrate the good results obtained with the combination of dyes of the invention comparative experiments A and B described below were carried out.

Comparative Experiment A

In this experiment two dye mixtures were prepared each containing a blue-violet dyestuff and a yellow-orange dyestuff. In each mixture the blue-violet dye was 1,4-di-(beta-hydroxyethylamino)-2-nitro-benzene, the yellow-orange component in one mixture being 1-(beta-hydroxyethylamino)-2-amino-4-nitro-benzene and in the other it was bis-(beta - hydroxyethyl)amino - 2 - amino - 4 -nitro-benzene.

The two dye mixtures each had the following composition:

| | Percent |
|---|---|
| Blue-violet dye | 0.5 |
| Yellow-orange dye | 0.5 |
| Wetting agent (sodium alkyl sulphonate) | 1.0 |
| Dipropylenetriamine | 2.0 |
| Water | to 100.0 |

The above compositions were used to dye strands of white hair, half permanently waved, by treatment for 20 minutes at room temperature.

The mixture containing as the yellow-orange component bis-(beta-hydroxyethyl)-amino-2-amino-4-nitro - benzene dyed the hair an even natural brown colour with only a slight difference in intensity of colour between the waved and unwaved portions of the hair.

In contrast to this, with the hair dyed using the other composition there was a marked difference in the shades produced on the two halves of the hair.

Comparative Experiment B

In this comparative experiment two compositions consisting of

| | Percent |
|---|---|
| Blue-violet dye | 0.5 |
| Yellow-orange dye | 0.5 |
| Wetting agent (sodium alkyl sulphonate) | 1.0 |
| Dipropylenetriamine | 2.0 |
| Water | to 100.0 | were again employed and the compositions were used to dye strands of white hair, half permanently waved, by treatment at 30° C. for 20 minutes.

In each case the blue-violet dye was the same as employed in Comparative Experiment A.

In one case the yellow-orange dye was bis-(beta-hydroxyethyl)-amino-2-amino-4-nitro-benzene and in the other it was 1,2-di-(beta-hydroxyethylamino)-4-nitro-benzene.

The composition containing as the yellow component bis-(beta - hydroxyethyl) - amino - 2 - amino - 4 - nitro-benzene gave very noticeably better results. The hair was dyed with the composition containing this dyestuff an even natural brown shade; there was a slight difference in intensity of shade between the two halves of the hair.

In contrast to this result the other composition dyed the hair an unnatural and less even brown colour.

These experiments show the superior results obtained when the yellow-orange component has two hydroxyalkyl groups which are both attached to the same nitrogen atom.

Other experiments similar to Comparative Experiment B were carried out using as the yellow-orange component the dyes Acid Orange 3 (Colour Index Number: 10385), Acid Yellow 11 (Colour Index Number: 18820), and 2-amino-4-nitro-phenol. In none of these experiments was the hair dyed an even natural brown shade.

Still further experiments similar to Comparative Experiment B were carried out using as the blue-violet component the dyestuff 1-bis-(beta-hydroxyethyl)-amino-4-(beta-hydroxyethyl)-amino-3-nitro-benzene and as the yellow-orange component Acid Orange 3, Acid Yellow 11, 2-amino-4-nitro-phenol, 1-(beta-hydroxyethylamino)-2-amino-4-nitro-benzene, and bis-(beta - hydroxyethyl)-amino-2-amino-4-nitro-benzene. Again in no case was the hair dyed an even natural brown shade.

What is claimed is:

1. A hair colourant comprising a blue-violet component having the formula and a yellow-orange component being a dyestuff of the formula where in each formula $R^1$ and $R^2$ represent hydroxyalkyl having 2 to 6 carbon atoms; and $R^3$ and $R^4$ represent hydrogen or alkyl having 1 to 4 carbon atoms.

2. The hair colourant according to claim 1 in which the yellow-orange component is bis-(beta-hydroxyethyl)-amino-2-amino-4-nitro-benzene.

3. The hair colourant according to claim 1 in which the yellow-orange component is N-(beta-hydroxyethyl)-N-(beta-hydroxypropyl)-amino-2-amino-4-nitro-benzene.

4. The hair colourant according to claim 1 in which the yellow-orange component is bis-(beta-hydroxypropyl)-amino-2-amino-4-nitro-benzene.

References Cited

UNITED STATES PATENTS

| | | | |
|---|---|---|---|
| 2,687,431 | 8/1954 | Marschall | 260—573 X |
| 2,750,326 | 6/1956 | Eckardt | 167—88 |
| 2,750,327 | 6/1956 | Eckardt | 167—88 |
| 3,088,878 | 5/1963 | Brunner | 167—88 |

FOREIGN PATENTS 805,746  12/1958  Great Britain.

OTHER REFERENCES

Heald: American Perfumer and Cosmetics, vol. 78, No. 4, April 1963, pp. 40, 41, 44 and 47–51.

ALBERT T. MEYERS, *Primary Examiner.*

VERA C. CLARKE, *Assistant Examiner.*

U.S. Cl. X.R.

8—10.1